(No Model.) 2 Sheets—Sheet 2.
G. M. HINKLEY.
OFFSETTING DEVICE FOR SAW MILL CARRIAGES.
No. 368,669. Patented Aug. 23, 1887.
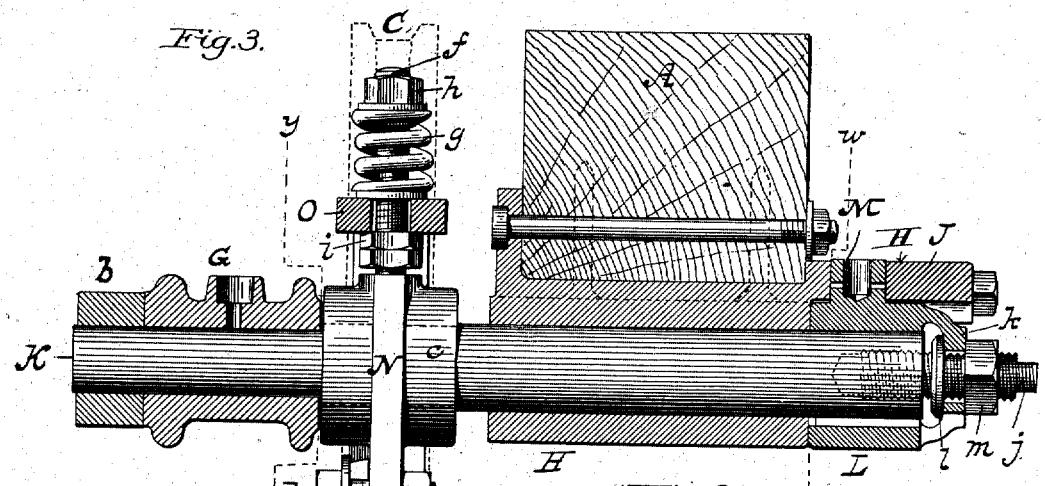
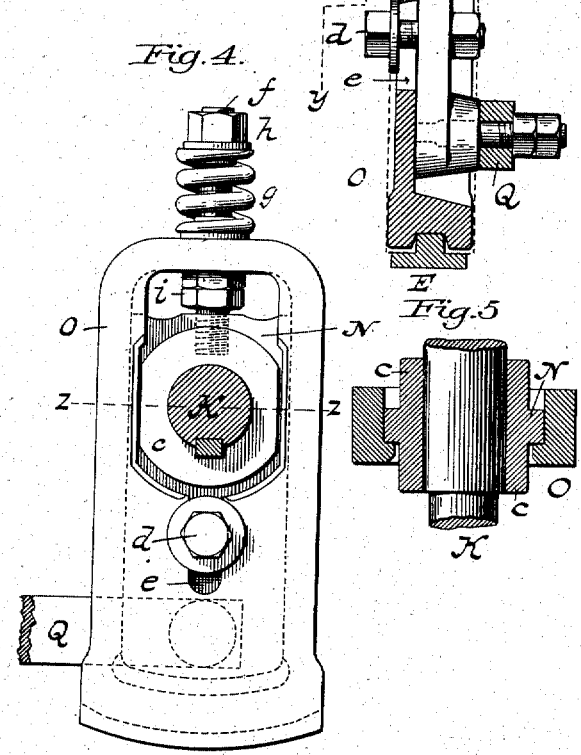
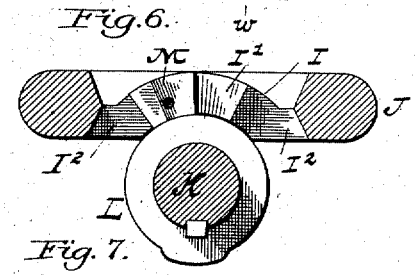
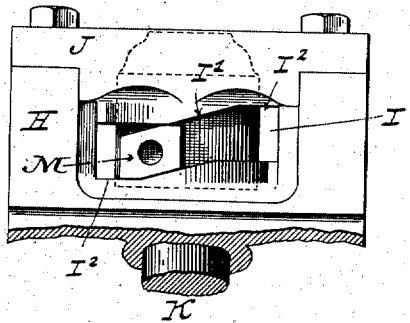
Witnesses:
James P. DuHamel
Walter S. Dodge
George M. Hinkley,
Inventor,
by Dodge & Son,
his Attys.
N. PETERS, Photo-Lithographer, Washington, D. C.

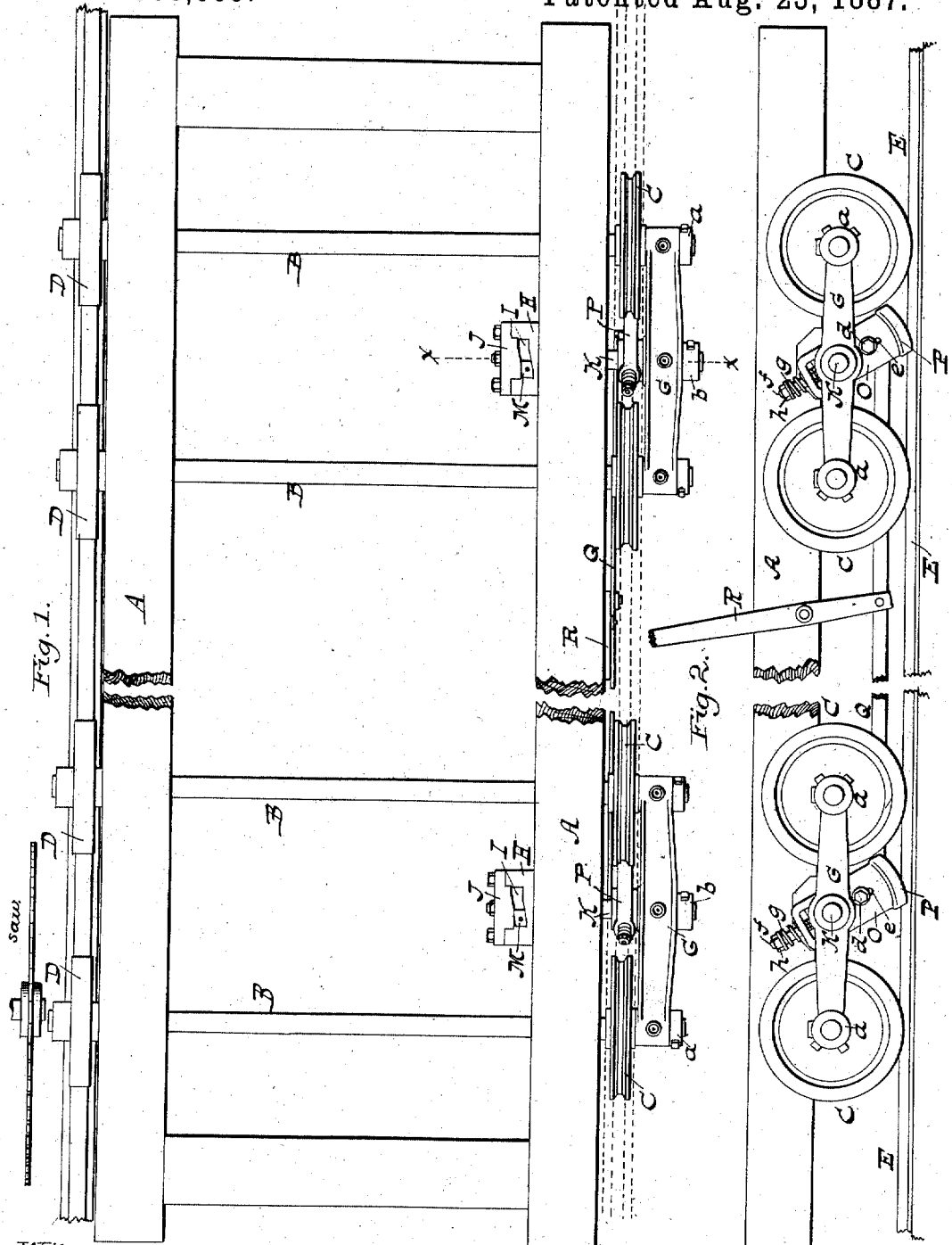

UNITED STATES PATENT OFFICE.

GEORGE M. HINKLEY, OF MILWAUKEE, WISCONSIN, ASSIGNOR OF ONE-HALF TO EDWARD P. ALLIS, OF SAME PLACE.

OFFSETTING DEVICE FOR SAW-MILL CARRIAGES.

SPECIFICATION forming part of Letters Patent No. 368,669, dated August 23, 1887.

Application filed April 29, 1886. Serial No. 200,602. (No model.)

*To all whom it may concern:*

Be it known that I, GEORGE M. HINKLEY, of Milwaukee, in the county of Milwaukee and State of Wisconsin, have invented certain new and useful Improvements in Offsetting Devices for Saw-Mill Carriages, of which the following is a specification.

My invention relates to saw-mill carriages, and has for its object the automatic offsetting of the same to and from the saw.

In the drawings, Figure 1 is a top plan view of my improved saw-mill carriage; Fig. 2, a side view of the same; Fig. 3, a section on the line $x\ x$ of Fig. 1; Fig. 4, a section on the line $y\ y$ of Fig. 3; Fig. 5, a section on the line $z\ z$ of Fig. 4; Fig. 6, a section on the line $w\ w$ of Fig. 3, and Fig. 7 a top plan view of the devices shown in Fig. 6.

The invention has reference to that class of carriages which are shifted bodily upon their axles at right angles to the line of travel to and from the saw; and it consists in providing the carriage with a depending arm, one or or more, which, by frictional contact with one of the ordinary rails upon which the carriage moves, or a special rail, serves to offset the carriage automatically as its direction of travel is reversed.

The improvements further relate to various features and details, hereinafter set forth and claimed.

A indicates the saw-mill carriage as a whole, provided with axles B and wheels C D, wheels C being flanged or grooved to run upon a correspondingly-shaped rail, E, while the wheels D run upon a flat rail, as is usual in that class of carriages. As shown in Figs. 1 and 2, the axles B are extended out through their wheels and connected in pairs by a bar, G. The bar fits loosely upon the ends of the axles, allowing the latter to turn freely therein, collars $a$ being secured to the ends of the axles to retain the connecting-bar G in place.

H indicates a plate or bearing bolted or otherwise secured to the under side of one of the longitudinal timbers of the carriage, as shown in Figs. 1 and 3, the plate or bearing being preferably placed midway between the axles B. This plate or bearing H is provided at its inner end with a slot, I, having vertical walls I', one of the side walls being formed by a cap-plate, J, bolted to the end of plate H, as shown in Figs. 1, 2, 6, and 7. It will be observed that the slot I is made angling or cam-shaped, for a purpose presently explained.

K indicates a shaft which is journaled in the plate or bearing H, and supported at its forward end in the bar G, as shown in Figs. 1 and 3, the shaft being prevented from moving endwise by means of a collar, $b$, secured thereto outside of bar G. At its inner end the shaft K is provided with a hub or enlargement, L, from the upper face of which projects a stud or finger, M, as shown in Figs. 1, 3, 6, and 7, the finger extending upward into and fitting closely the slot I in the plate H.

The hub L is keyed to shaft K and capable of adjustment longitudinally thereon by means of a screw, $j$, which fits in a threaded socket in the end of the shaft, as shown in Fig. 3. The screw $j$ projects out through an arm, $k$, at the end of the hub, which is perforated for that purpose, and is provided on one side of the arm with a collar or nut, $l$, and on the other side with a nut, $m$.

By loosening the nuts $l\ m$ and turning the screw $j$ the hub is moved longitudinally upon the shaft K to compensate for wear of the stud M. As the shaft K is rocked in its bearings, the stud or finger M moves in the slot I from one side to the other, and as the shaft is prevented from moving lengthwise the stud riding on the cam or angling face of the slot in the plate or bearing H moves the latter lengthwise upon the shaft K, and of course moves the carriage upon its axles. At each end of the slot I the angling walls I' terminate in walls or faces I², which are at right angles to the shaft K, so that after the carriage is shifted a slight movement of the lug M toward the end of the slot will not affect the position of the carriage. Upon the shaft K, between the bar G and the carriage, is secured a depending arm, P, which is in the same vertical plane with the wheels C, and consequently directly over the track or rail E, as shown in Figs. 1 and 3. This depending arm P consists of a plate, N, keyed or otherwise rigidly secured to the shaft K, provided with an elongated hub, $c$, and encircled by or carrying a yoke or frame, O, the two parts N O being held together by means of a bolt, $d$, passing through them, as shown in Figs. 3 and 4. This bolt works in a slot, $e$, in the plate O, as shown in Figs. 3 and 4, and allows the latter to move longitudinally upon the plate N, as hereinafter described. Projecting from the top of plate N and extending upward through the top of yoke or frame O is a rod or stem, f, which, above the yoke, is encircled by a spiral spring, g, which latter is held in place by nuts h, as shown in Figs. 3 and 4. Nuts i are applied to the stem f between the parts N O, by which to adjust the compression of the spring.

Plate or yoke O has its lower edge curved on the arc of a circle concentric with shaft K, and it is also grooved or channeled on its lower edge to conform to the shape of the rails on which the carriage travels, as clearly shown in Figs. 3 and 4.

Upon reference to the drawings it will be observed that the arm P occupies a position directly over the rail E, and preferably is normally in an inclined position.

Q indicates a rod or bar connecting the arm P with a hand-lever, R, pivoted to the carriage, as shown in Figs. 1 and 2.

The device, being thus constructed, operates as follows: Suppose, for instance, that the carriage has just completed its movement to the left, and it is desired to offset it preparatory to gigging back to the right. Now, as the carriage is moved to the right, the depending arm P, bearing upon the rail E at one side of its center, bites or takes hold upon the rail and rocks or swings with its shaft to the other side of its center. In thus swinging or rocking the shaft K is consequently turned in its bearing and the stud or finger M moved through the angling slot I, thus causing a horizontal movement of the carriage or the plate H on its shaft K. After gigging back, when it is desired to set the carriage up toward the saw preparatory to a cut, a reversal in the direction of the travel of the carriage causes the arm P to swing upon its shaft K as a fulcrum. In thus swinging or rocking, the spring g, applied to the arm P, allows the yoke O to slide longitudinally upon the plate N a limited distance, so that any tendency there might be of the arm P to raise or lift the carriage off the track when the arm is in a vertical position is obviated, and whereby also the arm is held in contact with the rail.

It will be seen that instead of a rigid stud or finger, M, a roller may be employed or the stud or finger provided with a roller. It is also apparent that instead of using the angling slot and the upright stud the shaft may be provided with a screw-thread to engage with the plate H.

When it is desired to reverse the travel of the carriage in the middle of a cut, the lever R is thrown to one side, elevating the arm P from the track, the straight portion I² of slot I permitting the rotation of the shaft sufficiently for the purpose without offsetting the carriage.

I prefer that there shall be two or more arms P to each carriage, one near each end, in order that both ends may be moved evenly and without any cramping or binding action; but it is apparent that the arm and its shaft and bearing may be placed midway between the ends of the carriage, if desired.

While it is best in most cases to so arrange the parts that the arm P shall ride upon one of the carriage-rails, it will be seen that a special rail may be provided for it or that it may run upon the floor.

The carriage may, should occasion require, be shifted by means of the hand-lever, though it is desired, generally, to shift the carriage automatically.

I am aware of the patent granted to Theron W. Peck, January 5, 1886, No. 333,664, and I make no claim to anything therein shown. Under that arrangement the depending arms strike against fixed inclined plates upon the floor, whereas under my plan the depending arms rest upon the rails and serve by frictional contact with the rail as the travel of the carriage is reversed (regardless of the point at which the reversal takes place) to offset the carriage to and from the saw.

It will be observed that in the device heretofore patented the offsetting mechanism is applied to the carriage-axles; but in my device the offsetting mechanism is independent of the axles.

I am also aware that it has been proposed to employ in connection with a saw-mill carriage and its track a separate toothed rail, and to mount upon the carriage a screw-shaft having an arm to engage with the toothed rail when the travel of the carriage is reversed, preparatory to gigging back, and to such construction I lay no claim.

Having thus described my invention, what I claim is—

1. In combination with a saw, a track by the side thereof, a carriage movable upon said track past the saw, a plate mounted upon the carriage and provided with an inclined guide, a shaft journaled upon the carriage and provided with a projection to engage with or enter said guide, and an arm secured to said shaft and serving by frictional contact with a rail in line with the carriage to rock the shaft in its bearings and shift the carriage to and from the saw as the direction of the travel of the carriage is reversed.

2. In combination with a track, a saw-mill carriage mounted thereon and adapted to move upon its axles at right angles to the line of travel, a cam-plate, a shaft engaging therewith to offset the carriage, and an arm secured upon said shaft and serving by frictional contact with the carriage floor or rail, when the carriage is reversed, to swing in the direction of the travel of the carriage to rock the shaft in its bearings and shift the carriage.

3. In combination with a saw, an offsetting-carriage movable past the saw, an arm at each end thereof bearing upon the carriage floor or rail thereon and adapted to offset the carriage, and a lever journaled on the frame and connected to the arms and adapted to raise the latter off the rail to render them inoperative.

4. In combination with a saw and an offsetting carriage movable past the saw, a plate, H, secured to the carriage and provided with an angling slot, I, a shaft, K, journaled on the carriage, a stud, M, secured to shaft K and working in the slot, and an arm, P, also secured to the shaft and resting upon the carriage rail or floor.

5. In combination with a track and with an offsetting carriage movable thereon, a cam-plate, as H, secured to the carriage, a shaft, as K, having a projection engaging with the plate for offsetting the carriage, and an arm, P, secured to the shaft and composed of a rigid plate, N, and sliding yoke O, arranged, substantially as shown, to shift the carriage automatically as its direction of travel is reversed.

6. In combination with a track and an offsetting carriage mounted thereon, a shaft, K, journaled therein, for offsetting the same, and an arm, P, secured to the shaft, provided with plate N, yoke O, and interposed spring $g$, the arm P resting upon the track, as and for the purpose set forth.

7. In combination with carriage A, axles B, and wheels C D, track E, a bar, G, connecting two of the axles, a plate, H, secured to the carriage, an angling slot therein, a shaft journaled at one end in the bar G and at the other end in plate H, a hub, L, secured to shaft K, a stud, M, secured to the hub and projecting into the slot I, and an arm, P, secured to shaft K, and resting upon the track E, as and for the purpose set forth.

8. In combination with carriage A and a shaft, K, journaled therein and serving to offset the carriage, a hub, L, secured to the shaft, a screw, $j$, passing through the hub into the end of the shaft, and nuts $l$ $m$ upon screw $j$, serving to adjust the hub longitudinally upon its shaft.

9. In combination with a saw-mill carriage, a plate, H, secured thereto, a slot, I, in said plate, provided with angling walls I' and straight walls I², a shaft journaled on the carriage and provided with a stud, M, to enter the slot I, and an arm, P, secured to the shaft and resting upon a rail.

10. In combination with a track and an offsetting carriage movable thereupon, a cam-plate secured to said carriage, a shaft, K, mounted upon the carriage and engaging with the plate to offset the carriage, and an arm, P, secured to said shaft, adapted to swing parallel with the track, and having its lower edge grooved to run upon the track.

11. In combination with a track and an offsetting saw-mill carriage, a cam-plate, H, thereon, a shaft, K, engaging with the plate to offset the carriage, and an arm, P, secured to the shaft and having its lower edge curved in the direction of its movement and adapted to rest upon the track, as and for the purpose set forth.

12. In combination with a saw, a track by the side thereof, an offsetting carriage movable past the saw, a plate, H, secured to the carriage, a shaft, K, engaging therewith to offset the carriage, and a friction-arm, P, rigidly secured to said shaft and bearing upon the track.

13. In combination with a saw and an offsetting carriage movable past the same, a cam-plate, H, secured to the carriage, a shaft, K, engaging therewith to offset the carriage, an arm, P, adapted and arranged, substantially as shown, to rock the shaft, and a hand-lever pivoted to the carriage and connected with the shaft or its arm, as and for the purpose explained.

14. In combination with a saw, a track by the side thereof, a carriage movable upon said track past the saw, an automatic offsetting device constructed, substantially as shown, to offset the carriage to and from the saw, and a hand-lever mounted upon the carriage and connected with the automatic offsetting mechanism, substantially as described, whereby the hand-lever is adapted either to throw the offsetting mechanism out of action or to operate the same, as desired.

15. In combination with a saw, a track by the side thereof, a log-carriage movable upon the track past the saw, an offsetting mechanism, substantially such as shown, for moving the log-carriage to and from the saw, and an arm connected with the offsetting mechanism journaled on the carriage, so as to swing in the direction of the travel of the carriage and to bear upon a rail of the track, whereby when the travel of the carriage is reversed the arm is caused to swing to one or the other side of its journal and actuate the offsetting mechanism.

16. In combination with a saw, a fixed track, and a log-carriage movable upon the track past the saw, an offsetting mechanism, constructed substantially as described, applied to the carriage, a shaft connected with the offsetting mechanism, and an inclined arm rigidly secured to said shaft and bearing upon a rail of the track throughout the travel of the carriage, whereby when the direction of travel of the latter is reversed the inclined arm is swung to one or the other side of its journal or shaft to cause the latter to actuate the offsetting mechanism.

17. In combination with a track and an offsetting carriage mounted thereon, a shaft, K, journaled on the carriage and connected with and actuating the offsetting mechanism, an inclined arm, P, secured to the shaft K and provided with a spring-sustained foot or yoke to bear upon a track, substantially as shown, whereby when the carriage is reversed the spring-sustained foot yields to allow the arm to swing from one side of its center to the other.

GEORGE M. HINKLEY.

Witnesses:
WM. W. ALLIS,
EDW. F. BYRON.